Dec. 27, 1949 R. W. ZAJICEK 2,492,676
COLLAPSIBLE HAMPER CART
Filed April 2, 1947 2 Sheets-Sheet 1

INVENTOR.
RICHARD W. ZAJICEK
BY
Maurice L. Capp
ATTORNEY

Dec. 27, 1949 R. W. ZAJICEK 2,492,676
COLLAPSIBLE HAMPER CART
Filed April 2, 1947 2 Sheets-Sheet 2
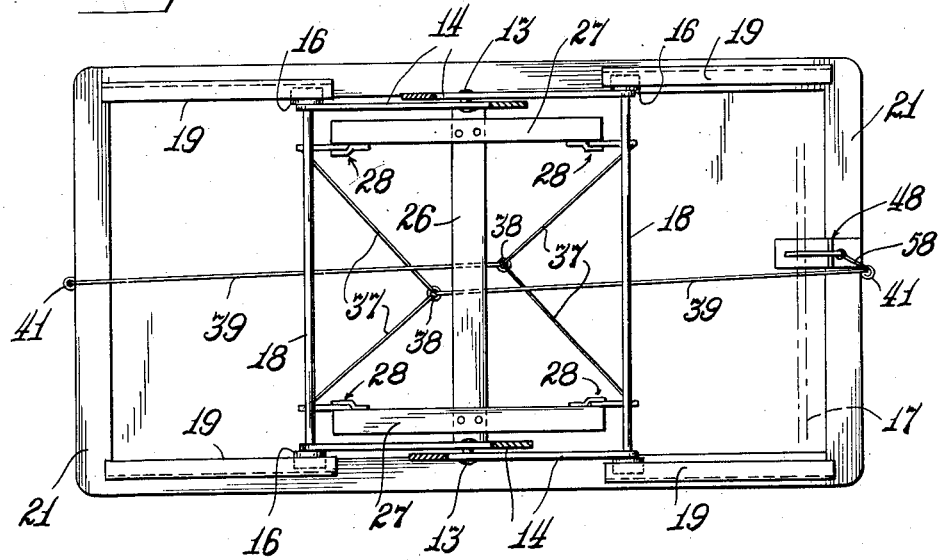
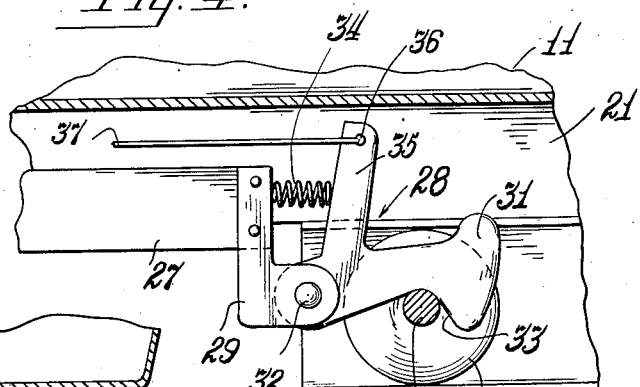
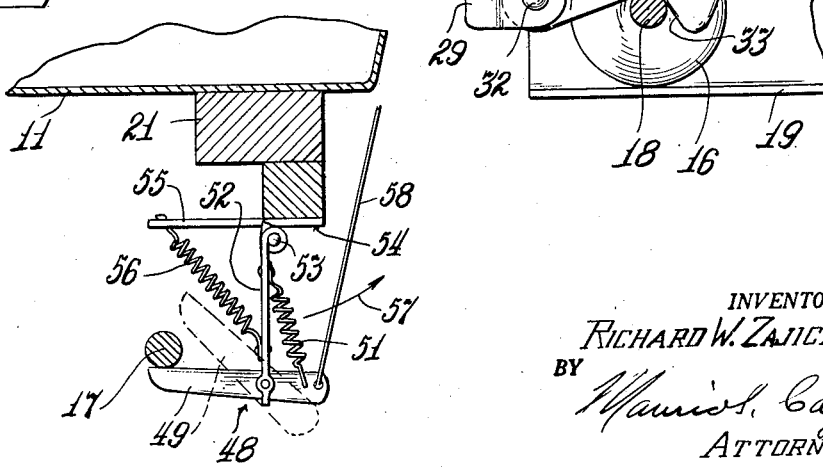
INVENTOR.
RICHARD W. ZAJICEK
BY
ATTORNEY Patented Dec. 27, 1949

2,492,676

UNITED STATES PATENT OFFICE 2,492,676

COLLAPSIBLE HAMPER CART

Richard William Zajicek, Hammond, Ind.

Application April 2, 1947, Serial No. 738,809

5 Claims. (Cl. 280—36)

The invention relates to improvements in hamper carts, and more particularly to a hamper or basket having a wheeled frame structure connected thereto and movable from a position collapsed against the bottom of the hamper into an extended or hamper supporting position.

The present invention is concerned with the novel construction of such hamper cart and with novel means to afford secure locking of the frame structure while it is collapsed or extended and further with means to effect automatic extension of the frame structure when the means holding it collapsed is released.

It is therefore an object of the invention to provide a hamper cart embodying the features outlined hereinabove.

Another object is to provide a novel latch structure and manually actuable means for operating the latch structure.

Another object is to provide a structurally rigid collapsible hamper cart which is not expensive to construct and which is easy to manipulate, positive in construction, and highly efficient in use.

Other and further objects of the present invention will be apparent from the following description and claims and are illustrated in the accompanying drawing. Other embodiments of the invention embodying the same principle may be used, and structural changes may be made as desired by those skilled in the art without departing from the present invention and the purview of the appended claims.

In the drawings:

Fig. 3 is an inverted plan view showing the legs partly broken away.

Fig. 4 is a detail elevational view of one of the latches provided to lock the legs in extended position.

Fig. 5 is a sectional detail view through an end portion of the hamper cart illustrating the latch mechanism for securing the legs in collapsed position.

Figure 1:
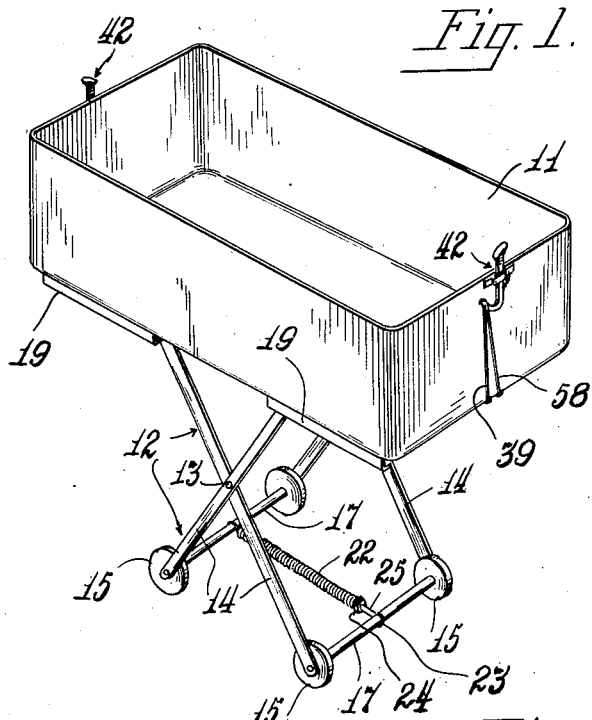
Fig. 1 is a perspective view of a hamper cart embodying features of the present invention.

Referring particularly to the accompanying drawings, the improved hamper cart includes a hamper 11, which preferably is substantially rectangular in shape and may be constructed of any suitable material, such as wood, metal or reed, having a pair of leg frames 12 movably secured to the bottom thereof in a manner to be described hereinafter. The leg frames are crossed and pivotally connected together as at 13 so as to substantially define a jack knife structure.

Each of the leg frames 12 includes a pair of legs 14 having wheels 15 on their lower ends and rollers 16 on their upper ends. A tie rod 17 extends between the legs 14 of each frame and constitutes the axle for the wheels 15 carried thereby. A similar tie rod 18 connects the upper ends of the legs 14 of each frame, which tie rods may constitute the axles for the rollers 16. The rollers 16 on the upper ends of the frames 12 are suitably guided in pairs of tracks 19 securely mounted on the bottom face of a substantially rectangular open framelike structure 21 reinforcing the bottom of the hamper 11.

Figure 2:
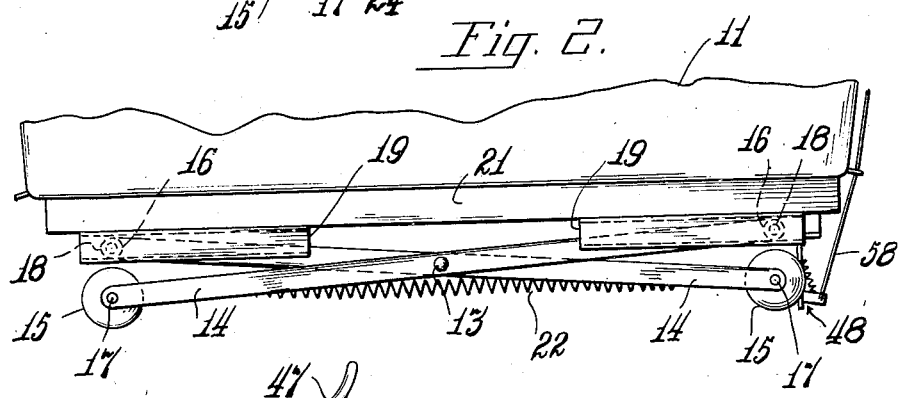
Fig. 2 is a fragmentary side elevation view of the hamper cart showing the frame collapsed.

As best illustrated in Fig. 3, the tracks 19 are channel shaped and are arranged in pairs, one pair at each end of the frame 21. This structure affords limited means for guiding movement of the rollers 16 longitudinally of the bottom of the hamper 11 so as to enable the frames to be moved from the extended position shown in Fig. 1 into a collapsed position against the bottom of the hamper as shown in Fig. 2. Suitable latch means, to be described in detail hereinafter, is provided for securely retaining the frames 12 in either their extended or collapsed positions.

It may be noted at this time that when such latch means as is provided for holding the frames in their collapsed position is released, the frames automatically move into their extended position. This is accomplished by providing a suitable tension spring 22 extended between the tie rods 17 and suitably connected thereto as at 23. The tension spring 22 may be adjusted as to the degree of tension by manipulation of a nut 24 carried on a threaded stem 25 suitably connected in any conventional manner with one end of the spring 22. Such adjustment of the tension spring 22 is made at the time of assembly and the adjustment need not be altered during use.

The means for securely locking the frames 12 in their extended positions is best shown in Figs. 3 and 4. As there illustrated, the hamper frame 21 includes a rigid cross bar 26 located substantially midway between the ends thereof, having braces 27 firmly secured thereto and extending longitudinally of the basket on each side of the cross bar 26 with their ends terminating in substantial alignment with the inner ends of the tracks 19. A latch assembly, generally indicated at 28 in Fig. 4, is carried on each end of each of the braces 27. This latch assembly includes a mounting bracket 29 having a pawl 31 pivotally secured thereto, as at 32, and suitably formed on its lower edge with a notch recess 33 to receive therein the tie rod 18 of a related leg frame 12 when said tie rod is moved into the position illustrated. A compression spring 34 normally urges the pawl 31 into engagement with the tie rod 18 so as to prevent inadvertent disengagement thereof. The pawl 31 includes an arm 35 which extends upwardly therefrom and is suitably apertured at 36 to receive one end of a tension element, such as wire 37. The wires 37 leading from the two latches located at the related ends of the braces 27 are brought together at 38 and are jointly connected to a control line 39 which extends longitudinally beneath the bottom of the hamper 11 to one end thereof through an eyelet 41 and then upwardly over the hamper end for connection with a manually actuable control element.

Figure 6:
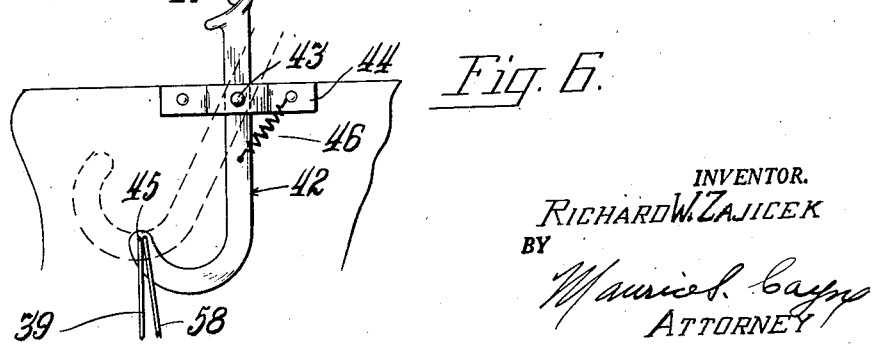
Fig. 6 is an enlarged detail elevational view of one of the manually actuable latch control elements.

The control element is best illustrated in Fig. 6. As there shown, it includes a substantially J-shaped actuating bar 42 pivotally mounted at 43 in a bracket 44 firmly secured to the hamper end wall adjacent the upper edge thereof. The control line 39 is secured to the short end of the actuating element, as at 45, and a spring 46, having its ends connected one to the bracket 44 and the other to the element 42, normally retains the element in the full line position illustrated. A suitably shaped pressure piece 47 may be formed on the upper end of the element 42 to afford convenient means whereby the element 42 may be manually engaged and rocked about its pivot 43 into substantially the dotted line position shown so as to pull the control line 39 and thereby release the two latches 28 connected therewith. It should be quite evident at this time that when the frames 12 are in their extended position the hamper 11 is supported at a convenient height, and that, when it is desired to store or carry the hamper 11, manually actuable elements 42 on each end thereof are actuated in the manner described hereinabove to release the latches 28 whereupon the hamper 11 may be pressed downwardly against the tension of spring 22 to move the leg frames 12 into their collapsed position.

The leg frames 12 are retained in their collapsed position against the tension of spring 22 by a single latch mechanism 48 best illustrated in Fig. 5. This latch mechanism is located at one end of the hamper 11 and depends from the bottom thereof so as to dispose its spring controlled pawl 49 in a position to be engaged by one of the tie rods 17 when the latter is moved upwardly against and beyond said pawl. A spring 51, connected at one end to the pawl 49 and at its other end to a hingedly mounted supporting bracket 52, normally retains the pawl in its full line locking position. The bracket 52 is hingedly mounted at 53 to a mounting plate 54 firmly secured to the hamper frame 21. This bracket includes an extension 55 which projects a considerable distance beyond the hinge portion thereof to provide mounting means for a pull spring 56 which is connected thereto at one end and to the hinge bracket 52 at its other end. This spring functions to hold the hinge bracket 52 in the full line position illustrated.

In order to release the collapsed frames, the hinge bracket 52 is moved in the direction of the arrow 57 so as to withdraw the pawl 49 from beneath the tie rod 17. Such movement of the hinge bracket 52 is best accomplished by means of a control line 58 which is connected to the pawl 49, as shown, and has its upper end suitably connected to the related manually actuable element 42. It will be observed that this arrangement is such as to constitute one of the manually actuable elements 42, the control means for both sets of latches, and that the mechanism is positive in its operation and exceedingly easy to manipulate.

Although a preferred embodiment of the invention has been disclosed herein, it should be understood that the invention is capable of embodying a wide variety of modification in detail structure without departing from the spirit of the invention or the scope of the appended claims.

I claim:

1. A hamper cart comprising a collapsible frame having wheels at its lower end and rollers on its upper end, a hamper, tracks on said hamper along which said rollers travel while the frame is being collapsed or extended, said frame comprising crossed pairs of legs having tie rods connecting the legs in each pair at their ends, and a plurality of manually actuable latches on the hamper engageable with the tie rods on the upper ends of the legs to secure the frame extended, and a latch engageable with one of said tie rods to secure the frame collapsed.

2. In a hamper having a collapsible supporting frame, a latch on the hamper engageable with the frame to hold it collapsed, said latch comprising a spring pressed pawl normally engageable by the frame, a hinge bracket on which said pawl is mounted, spring means effective to hold said bracket in one of a plurality of positions whereby the pawl may co-act with the frame, means to move said bracket to carry the pawl out of frame engaging position, and spring means effective to move the frame into extended position when the pawl is disengaged from the frame.

3. A hamper cart comprising a hamper, a collapsible frame normally supporting said hamper, means normally urging the frame into extended position, means reinforcing the bottom of the hamper, two pairs of latches carried by said means engageable with the frame to lock it extended, and a plurality of manual means independently operable to selectively release each pair of latches.

4. A hamper cart comprising a hamper, a collapsible frame normally supporting said hamper, means normally urging the frame into extended position, means reinforcing the bottom of the hamper, two pairs of latches carried by said means engageable with the frame to lock it extended, a plurality of manual means independently operable to selectively release each pair of latches, and additional latch means engageable with the frame when it is collapsed.

5. A hamper cart comprising a collapsible frame having wheels at its lower end and rollers on its upper end, a hamper, tracks on said hamper along which said rollers travel while the frame is being collapsed or extended, said frame comprising crossed pairs of legs having tie rods connecting the legs in each pair at their ends, at least one manual actuable latch on the hamper engageable with a tie rod on the upper end of the legs to secure the frame extended, and a latch engageable with one of the other tie rods to secure the frame collapsed.

RICHARD WILLIAM ZAJICEK.

REFERENCES CITED

The following references are of record in the file of this patent:

UNITED STATES PATENTS

| Number | Name | Date |
|---|---|---|
| 1,024,144 | Nauts | Apr. 23, 1912 |
| 1,121,744 | McLaughlin | Dec. 22, 1914 |
| 1,744,718 | Baumgartner | Jan. 28, 1930 |
| 1,895,290 | Lobel | Jan. 24, 1933 |